US011835045B2

(12) United States Patent
Yamamoto et al.

(10) Patent No.: US 11,835,045 B2
(45) Date of Patent: Dec. 5, 2023

(54) ROTARY COMPRESSOR (71) Applicant: DAIKIN INDUSTRIES, LTD., Osaka (JP)

(72) Inventors: Yuuichi Yamamoto, Osaka (JP); Makoto Adachi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/719,009

(22) Filed: Apr. 12, 2022

(65) Prior Publication Data

US 2022/0235770 A1 Jul. 28, 2022

Related U.S. Application Data (63) Continuation of application No. PCT/JP2020/038201, filed on Oct. 8, 2020.

(30) Foreign Application Priority Data

Oct. 15, 2019 (JP) ................................. 2019-188530

(51) Int. Cl.
*F04C 23/02* (2006.01)
*H02K 1/16* (2006.01)
*H02K 7/14* (2006.01)

(52) U.S. Cl.
CPC ............ *F04C 23/02* (2013.01); *H02K 1/165* (2013.01); *H02K 7/14* (2013.01); *F04C 2240/40* (2013.01);
(Continued)

(58) Field of Classification Search
CPC .. F04C 23/02; F04C 2240/40; F04C 2240/60; F04C 29/00; F04C 29/06; H02K 1/165;
(Continued)

(56) References Cited

U.S. PATENT DOCUMENTS 6,234,768 B1 * 5/2001 Harakawa ............... F04B 35/04
417/366
6,533,558 B1 * 3/2003 Matsumoto ......... F04C 29/0085
417/410.3
(Continued)

FOREIGN PATENT DOCUMENTS

CN 101764438 A 6/2010
JP 2000-179463 A 6/2000
(Continued)

OTHER PUBLICATIONS

International Search Report of corresponding PCT Application No. PCT/JP2020/038201 dated Nov. 10, 2020.
(Continued)

*Primary Examiner* — Charles G Freay
*Assistant Examiner* — Lilya Pekarskaya
(74) *Attorney, Agent, or Firm* — Global IP Counselors, LLP (57) ABSTRACT A rotary compressor includes a compression mechanism, a casing, a motor stator and a motor rotor. The motor stator includes stacked steel plates, teeth, and slots. The stacked steel plates are fixed to an inner surface of the casing. A number of the teeth and slots is nine. The motor rotor rotates a crankshaft to drive the compression mechanism. The stacked steel plates have first to ninth areas radially outside the nine teeth, first concave portions provided in five of the areas, and a second concave portion provided in at least one of four areas other than the five areas. The five first concave portions and an inner circumferential surface of a cylindrical portion form five first passages. The second concave portion and the inner circumferential surface of the cylindrical portion form at least one second passage.

17 Claims, 4 Drawing Sheets (52) U.S. Cl.
CPC ...... *F04C 2240/60* (2013.01); *H02K 2213/03* (2013.01)

(58) Field of Classification Search
CPC ........ H02K 7/14; H02K 2213/03; H02K 1/18; F04B 39/00
See application file for complete search history.

(56) References Cited

U.S. PATENT DOCUMENTS

| | | | | |
|---|---|---|---|---|
| 2009/0100861 A1* | 4/2009 | Higuchi | ................ | F04C 29/028 62/468 |
| 2010/0213788 A1* | 8/2010 | Guttenberger | ........... | H02K 1/18 310/216.135 |
| 2012/0019092 A1* | 1/2012 | Kataoka | .............. | F04C 29/0085 310/215 |
| 2015/0035404 A1* | 2/2015 | Taema | .................. | H02K 3/345 310/208 |
| 2017/0276135 A1* | 9/2017 | Komai | .................. | F04C 18/356 |
| 2018/0097419 A1* | 4/2018 | Suzuki | .................. | F04C 29/026 |

FOREIGN PATENT DOCUMENTS

| | | |
|---|---|---|
| JP | 2007-43842 A | 2/2007 |
| JP | 2010-288330 A | 12/2010 |
| JP | 2012-107587 A | 6/2012 |
| JP | 2018-13064 A | 1/2018 |
| JP | 2018-61420 A | 4/2018 |
| WO | 2007/123074 A1 | 11/2007 |

OTHER PUBLICATIONS

International Preliminary Report of corresponding PCT Application No. PCT/JP2020/038201 dated Apr. 28, 2022.
European Search Report of corresponding EP Application No. 20 87 6392.0 dated Oct. 5, 2022.

* cited by examiner

ROTARY COMPRESSOR

CROSS-REFERENCE TO RELATED APPLICATIONS

This is a continuation of International Application No. PCT/JP2020/038201 filed on Oct. 8, 2020, which claims priority to Japanese Patent Application No. 2019-188530, filed on Oct. 15, 2019. The entire disclosures of these applications are incorporated by reference herein.

BACKGROUND

Technical Field

The present disclosure relates to a rotary compressor.

Background Art

Conventionally a rotary compressor has a bottom portion that reserves lubricating oil lubricating a compression mechanism and a motor bearing. This lubricating oil reaches an upper high-pressure space provided above the rotary compressor. JP 2018-061420 A discloses a rotary compressor including a motor having a motor stator provided with nine concave portions.

SUMMARY

A rotary compressor according to a first aspect of the present disclosure includes a compression mechanism, a casing having a cylindrical portion and covering the compression mechanism, a motor stator and a motor rotor. The motor stator includes stacked steel plates obtained by stacking a plurality of steel plates, teeth, and slots. The stacked steel plates are fixed to an inner surface of the cylindrical portion. A number of the teeth and a number of the slots is nine. The motor rotor is configured to rotate a crankshaft that is configured to drive the compression mechanism. The stacked steel plates have first to ninth areas provided radially outside the nine teeth, first concave portions provided respectively in five of the first to ninth areas, and a second concave portion provided in at least one of four areas other than the five areas including the first concave portions. The five first concave portions and an inner circumferential surface of the cylindrical portion form five first passages allowing communication between a first side and a second side of the motor stator. The second concave portion and the inner circumferential surface of the cylindrical portion form at least one second passage allowing communication between the first side and the second side of the motor stator. Each of the first passages has a sectional area larger than a sectional area of the second passage. No passage having a sectional area larger than the sectional area of the first passage is formed in the four areas other than the five areas where the first passages are located. Three or more areas including the first concave portions are not continuous in the first area to the ninth area.

DETAILED DESCRIPTION OF EMBODIMENT(S)

Described hereinafter with reference to the drawings is a rotary compressor 10 according to an embodiment of the present disclosure. The following embodiment specifically exemplifies the present disclosure and is not intended to limit the technical scope of the present disclosure.

(1) ENTIRE CONFIGURATION

The rotary compressor 10 is applied to a vapor compression refrigeration apparatus or the like. The rotary compressor 10 according to the present embodiment is mounted on an outdoor unit of an air conditioner exemplifying the refrigeration apparatus, and constitutes part of a refrigerant circuit of the air conditioner.

Figure 1:
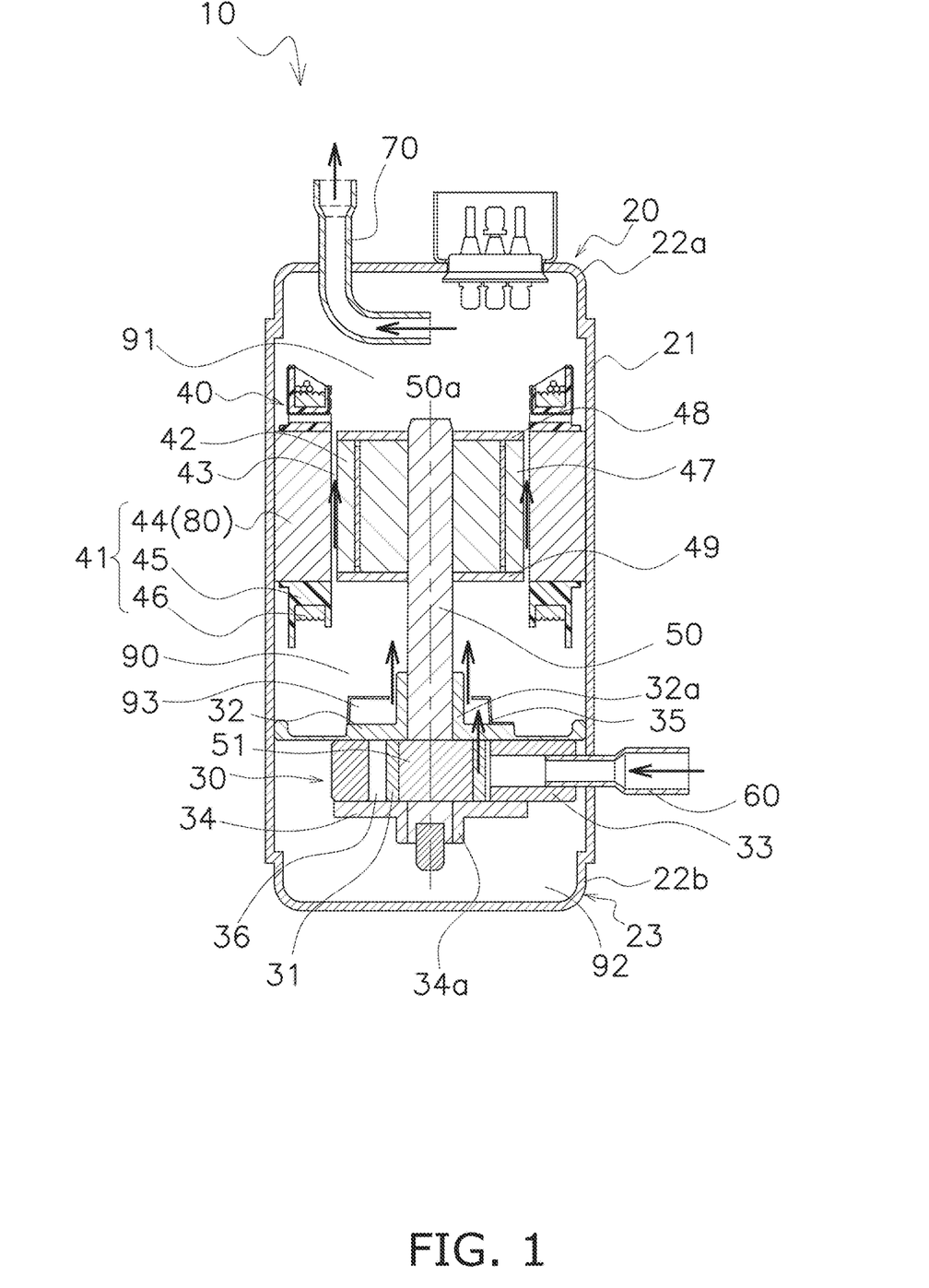
FIG. 1 is a longitudinal sectional view of a rotary compressor 10 according to an embodiment of the present disclosure.

FIG. 1 is a longitudinal sectional view of the rotary compressor 10 according to the embodiment of the present disclosure. FIG. 1 includes bold arrows indicating a flow of a refrigerant. The rotary compressor 10 includes a compression mechanism 30, a casing 20, a motor stator 41, a motor rotor 42, and a crankshaft 50. The motor stator 41 has a cylindrical shape and is provided on an outer circumference of the motor rotor 42. The motor stator 41 and the motor rotor 42 magnetically interact to rotate the motor rotor 42 and the crankshaft 50 about a rotation center 44c. The motor stator 41 and the motor rotor 42 constitute a motor 40.

(2) DETAILED CONFIGURATIONS

(2-1) Casing 20

The casing 20 principally accommodates the compression mechanism 30, the motor stator 41, the motor rotor 42, and the crankshaft 50. A suction pipe 60 and a discharge pipe 70 penetrate the casing 20 and are fixed to the casing 20 to secure airtightness of the casing 20.

The casing 20 has a cylindrical portion 21 having a cylindrical shape with opened upper and lower ends, and an upper lid 22a and a lower lid 22b provided at the upper end and the lower end of the cylindrical portion 21, each having a bowl shape, and closing the opened upper and lower ends of the cylindrical portion 21. The cylindrical portion 21 is fixed to the upper lid 22a and the lower lid 22b by welding to secure airtightness.

The casing 20 has a lower portion provided with an oil reservoir 92. The oil reservoir 92 reserves lubricating oil lubricating the compression mechanism 30 and the like.

(2-2) Compression Mechanism 30

The compression mechanism 30 principally includes a piston 31, a front head 32, a cylinder 33, a rear head 34, and a muffler 35. The front head 32, the cylinder 33, and the rear head 34 are fixed to one another by fastening or the like.

The compression mechanism 30 sucks and compresses low-pressure refrigerant gas, and discharges high-pressure refrigerant gas. The casing 20 has an internal space that corresponds to a space provided above the compression mechanism 30 and serves as a high-pressure space receiving refrigerant gas compressed by the compression mechanism 30. This high-pressure space includes a lower high-pressure space 90 provided below the motor 40 and an upper high-pressure space 91 provided above the motor 40.

The compression mechanism 30 includes a compression chamber 36 surrounded with the front head 32, the cylinder 33, and the rear head 34. The piston 31 is disposed in the compression chamber 36. The compression chamber 36 includes a suction chamber and a discharge chamber zoned by the piston 31. The suction chamber communicates with the suction pipe 60. The discharge chamber communicates with the lower high-pressure space 90 via a muffler space 93 to be described later.

The crankshaft 50 includes an eccentric shaft portion 51 fitted into the piston 31. When the crankshaft 50 rotates, the piston 31 turns about an eccentric shaft. Turn of the piston 31 causes periodical change in capacity of the suction chamber and the discharge chamber.

The front head 32 includes an upper bearing 32a supporting the crankshaft 50. The upper bearing 32a extends upward from a center of an upper surface of the front head 32. The front head 32 includes a discharge port configured to discharge, into the muffler space 93, a refrigerant in the compression chamber 36.

The cylinder 33 is a cylindrical member interposed between the front head 32 and the rear head 34. The cylinder 33 has an upper surface covered with the front head 32. The cylinder 33 has a lower surface covered with the rear head 34.

The rear head 34 includes a lower bearing 34a supporting the crankshaft 50. The lower bearing 34a extends downward from a center of a lower surface of the rear head 34.

The muffler 35 is fixed to the upper surface of the front head 32. The muffler 35 constitutes the muffler space 93 provided to reduce noise generated when a refrigerant is discharged from the discharge port of the front head 32. The muffler space 93 is surrounded with the muffler 35 and the front head 32. The muffler 35 has a hole allowing communication between the muffler space 93 and the lower high-pressure space 90.

(2-3) Crankshaft 50

The crankshaft 50 has an axis 50a extending in a vertical direction. The crankshaft 50 rotates about the axis 50a. The crankshaft 50 includes the eccentric shaft portion 51. The eccentric shaft portion 51 of the crankshaft 50 is fitted into the piston 31 of the compression mechanism 30. The crankshaft 50 has an upper portion coupled to the motor rotor 42.

(2-4) Motor 40

The motor 40 is disposed above the compression mechanism 30. The motor 40 principally includes the motor stator 41 and the motor rotor 42. The motor stator 41 has a substantially cylindrical shape and is fixed to the cylindrical portion 21 of the casing 20. The motor rotor 42 has a columnar shape and is disposed inside the motor stator 41. The motor stator 41 and the motor rotor 42 interpose a gap 43.

(2-4-1) Motor Stator 41

The motor stator 41 principally includes a core 44, an insulator 45, and a coil 46. The core 44 is fixed to an inner circumferential surface of the cylindrical portion 21 by shrink fitting or the like. The core 44 is constituted by stacked steel plates 80 obtained by stacking electromagnetic steel. The insulator 45 is attached to both vertical end surfaces of the core 44. The insulator 45 is made of a resin.

Figure 2:
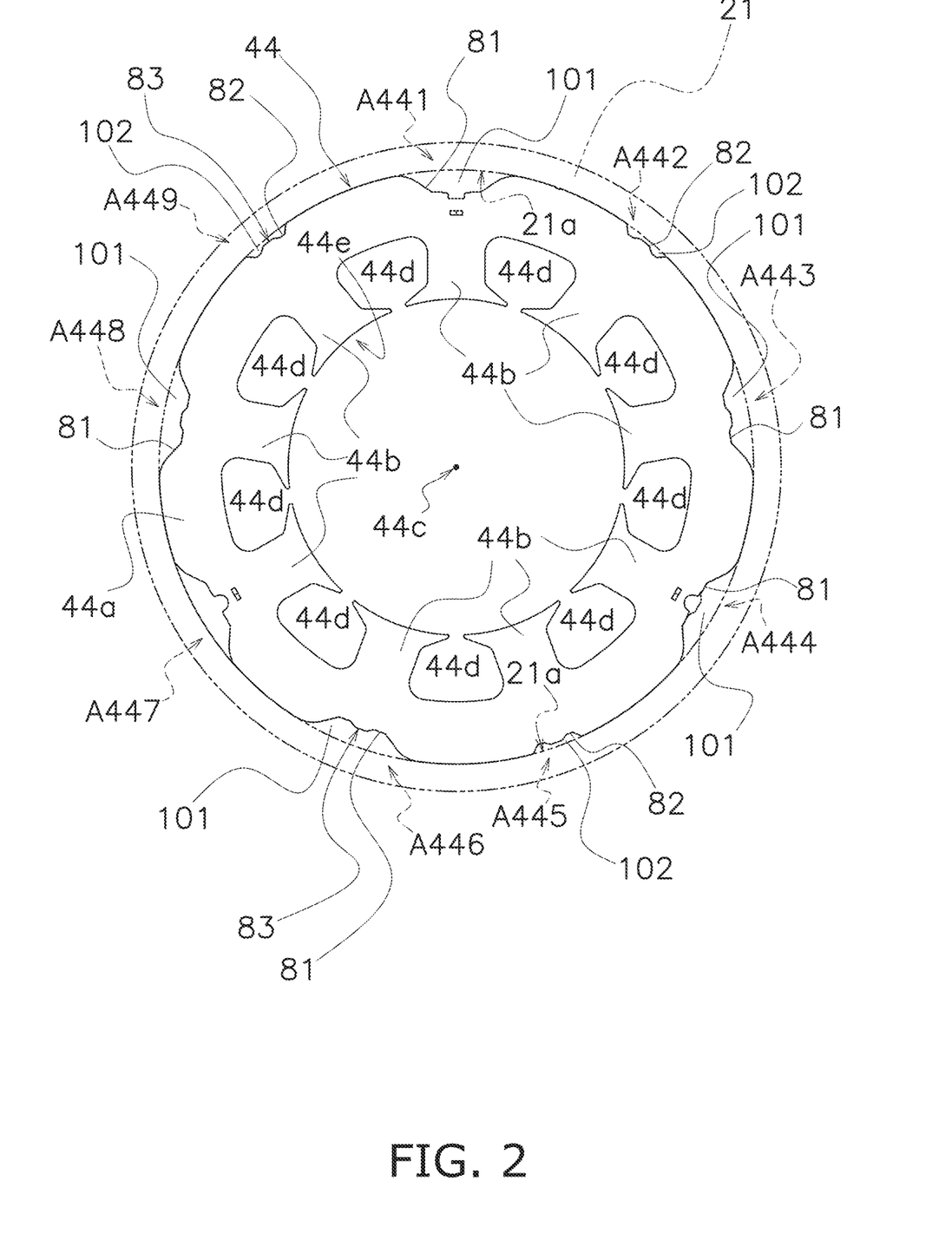
FIG. 2 is a plan view of a casing 20 and a core 44 according to the embodiment of the present disclosure.

As depicted in FIG. 2, the core 44 includes an annular portion 44a and nine teeth 44b. The annular portion 44a has a substantially cylindrical shape. The core 44 is disposed such that the rotation center 44c extends in the vertical direction. The nine teeth 44b project from an inner circumferential surface 44e of the annular portion 44a in a radially inward direction of the annular portion 44a. The nine teeth 44b are disposed at equal intervals along a circumference of the annular portion 44a. Hereinafter, nine spaces each provided between adjacent two of the nine teeth 44b along the circumference of the annular portion 44a will be called slots 44d. The coil 46 is constituted by a lead wire wound around the nine teeth 44b and the insulator 45.

FIG. 2 depicts first to ninth areas A441 to A449 provided radially outside the nine teeth 44b. Any five of these first to ninth areas A441 to A449 are each provided with a first concave portion 81. The first concave portions 81 according to the present embodiment are provided in the first area A441, the third area A443, the fourth area A444, the sixth area A446, and the eighth area A448.

The first concave portions 81 are cut-away sections provided in a vertical direction of the motor stator 41. The five first concave portions 81 and an inner circumferential surface 21a of the cylindrical portion 21 constitute five first passages 101 allowing communication between a first side and a second side of the motor stator 41.

There is further provided a second concave portion 82 in at least one of four areas other than the five areas including the first concave portions 81 among the areas provided radially outside the nine teeth 44b. The second concave portion 82 according to the present embodiment is provided in each of the second area A442, the fifth area A445, and the ninth area A449. There is further provided at least one second passage 102 that is constituted by the second concave portion 82 and the inner circumferential surface 21a of the cylindrical portion 21 and allows communication between the first side and the second side of the motor stator 41.

The first passages 101 and the second passage 102 are provided with a plurality of convex portions 83 made of weld bead.

The seventh area A447 is closed in the present embodiment.

(2-4-1-1) First Passages 101

The first passages 101 are provided in any five of the first to ninth areas A441 to A449 provided radially outside the nine teeth 44b.

The first passages 101 are used to return, to the oil reservoir 92, lubricating oil separated from a refrigerant by centrifugal force of a refrigerant flow in the upper high-pressure space 91 and adhering to an inner circumferential surface of the casing 20.

The five first passages 101 provided at the motor stator 41 are evenly disposed in the first to ninth areas A441 to A449. For example, the first passages 101 are provided respectively in the first area A441, the third area A443, the fourth area A444, the sixth area A446, and the eighth area A448. Even disposition of the first passages 101 in this manner inhibits unbalanced stress at the motor stator 41 when the motor 40 is fixed to the casing 20 by shrink fitting or the like.

(2-4-1-2) Second Passage 102

The second passage 102 is provided in at least one of four areas other than the five areas including the first passages 101 among the areas provided radially outside the nine teeth 44b.

The second passage 102 is used to return, to the oil reservoir 92, the lubricating oil separated from the refrigerant by the centrifugal force of the refrigerant flow in the upper high-pressure space 91 and adhering to the inner circumferential surface of the casing 20.

(2-4-2) Motor Rotor 42

The motor rotor 42 includes a rotor core 47, an upper plate 48, and a lower plate 49. The rotor core 47 is constituted by a plurality of vertically stacked metal plates. The rotor core 47 includes an embedded magnet. The upper plate 48 is a metal plate covering an upper end surface of the rotor core 47. The lower plate 49 is a metal plate covering a lower end surface of the rotor core 47.

(3) OPERATION OF COMPRESSOR

When the motor 40 is driven by electric power supplied from an external power source, the eccentric shaft portion 51 of the crankshaft 50 coupled to the motor rotor 42 eccentrically rotates about the axis 50a. Rotation of the crankshaft 50 causes rotation, about the axis 50a in the compression chamber 36, of the piston 31 provided with the eccentric shaft portion 51 fitted therein. Rotation of the piston 31 leads to periodical change in capacity of the suction chamber and the discharge chamber in the compression chamber 36.

In the rotary compressor 10, low-pressure refrigerant gas is sucked from an accumulator (not depicted) into the suction chamber of the compression chamber 36 through the suction pipe 60. The suction chamber is reduced in capacity by rotation of the piston 31. The refrigerant gas in the suction chamber is accordingly compressed, and the suction chamber turns into the discharge chamber filled with high-pressure refrigerant gas. The high-pressure refrigerant gas is discharged from the discharge chamber into the muffler space 93 via the discharge port, and is discharged from the muffler space 93 into the lower high-pressure space 90.

The refrigerant gas discharged into the lower high-pressure space 90 passes through the gap 43 between the motor stator 41 and the motor rotor 42, the first passages 101, and the second passage 102, and flows into the upper high-pressure space 91. The refrigerant gas in the upper high-pressure space 91 passes through the discharge pipe 70 and is supplied to the refrigerant circuit disposed outside the casing 20.

(4) RELATION AMONG THE NUMBER OF FIRST PASSAGES 101, SOUND LEVEL, AND OIL RUN OUT LEVEL

Described next is a relation among the number of first passages 101 provided at the motor stator 41, a level of sound generated from the rotary compressor 10, and an oil run out level. Terms "sound level" and "oil run out level" will be defined in (4-1) and (4-2) below.

(4-1) Sound Level

The sound level according to the present disclosure indicates amplitude of pressure by discharge pulsation in the upper high-pressure space 91 in the casing 20 of the rotary compressor 10.

In the rotary compressor 10, the internal space of the casing 20 has discharge pulsation generated by a refrigerant discharged from the compression mechanism 30. Discharge pulsation indicates pressure variation in a discharge space caused by a compressed refrigerant periodically flowing from the compression mechanism 30 into the discharge space. When such discharge pulsation propagates outside the compressor via the discharge pipe 70, the outdoor unit vibrates. This causes noise generated from the outdoor unit.

(4-2) Oil Run Out Level

The oil run out level according to the present disclosure indicates quantity of lubricating oil discharged outside the compressor due to running out of oil. Running out of oil indicates a phenomenon that lubricating oil is exhausted outside the compressor along with a high-pressure refrigerant discharged from the compressor.

Normally, lubricating oil reserved in the oil reservoir 92 of the casing 20 is principally supplied to a slide portion of the compression mechanism 30. The lubricating oil supplied to the slide portion of the compression mechanism 30 flows into the compression chamber 36. The lubricating oil is mixed into a refrigerant gas in the compression chamber 36. Accordingly, high-pressure refrigerant gas discharged from the compression mechanism contains the lubricating oil. Part of the lubricating oil contained in the high-pressure refrigerant gas is separated from the high-pressure refrigerant gas by centrifugal force of a refrigerant flow in the upper high-pressure space 91 of the motor 40 and adheres to the inner circumferential surface 21a of the cylindrical portion 21. The lubricating oil adhering to the inner circumferential surface 21a of the cylindrical portion 21 drops along the inner circumferential surface 21a of the cylindrical portion 21 to a level of an upper surface of the motor stator 41 in the motor 40. The lubricating oil then passes through the first passages 101 and the second passage 102 at the core 44 to drop. The lubricating oil passing through the first passages 101 and the second passage 102 eventually returns to the oil reservoir 92. In a case where the lubricating oil does not return to the oil reservoir 92 in the above manner but is exhausted outside the compressor, the lubricating oil is short and the rotary compressor is deteriorated in reliability.

4-3

Figure 4:
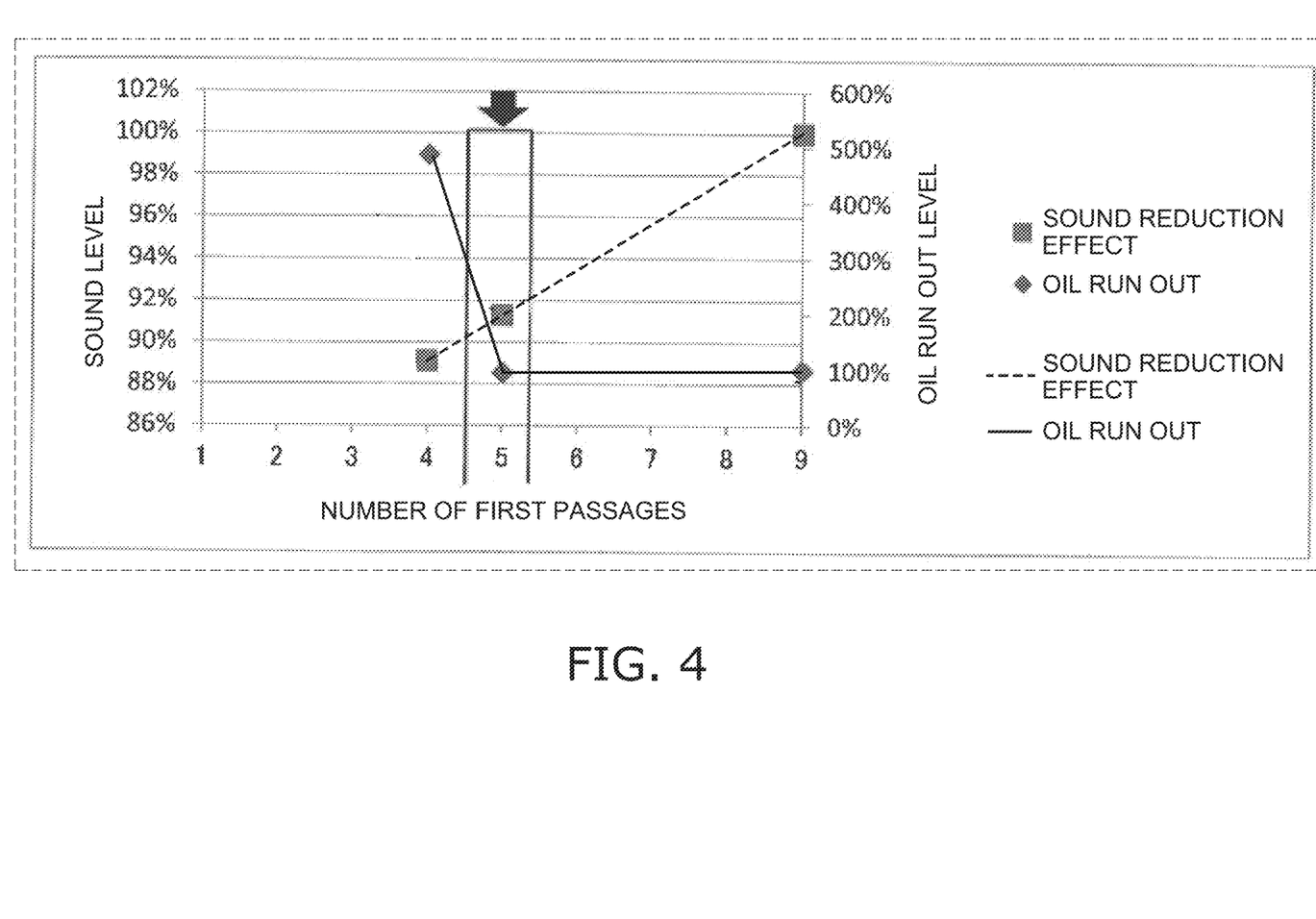
FIG. 4 is a graph indicating a relation among the number of first passages 101, a sound level, and oil run out quantity.

FIG. 4 is a graph indicating the relation among the number of first passages 101, the sound level, and the oil run out level. The sound level and the oil run out level are each assumed herein to have a reference state (100%) where there are provided nine first passages 101.

Figure 3:
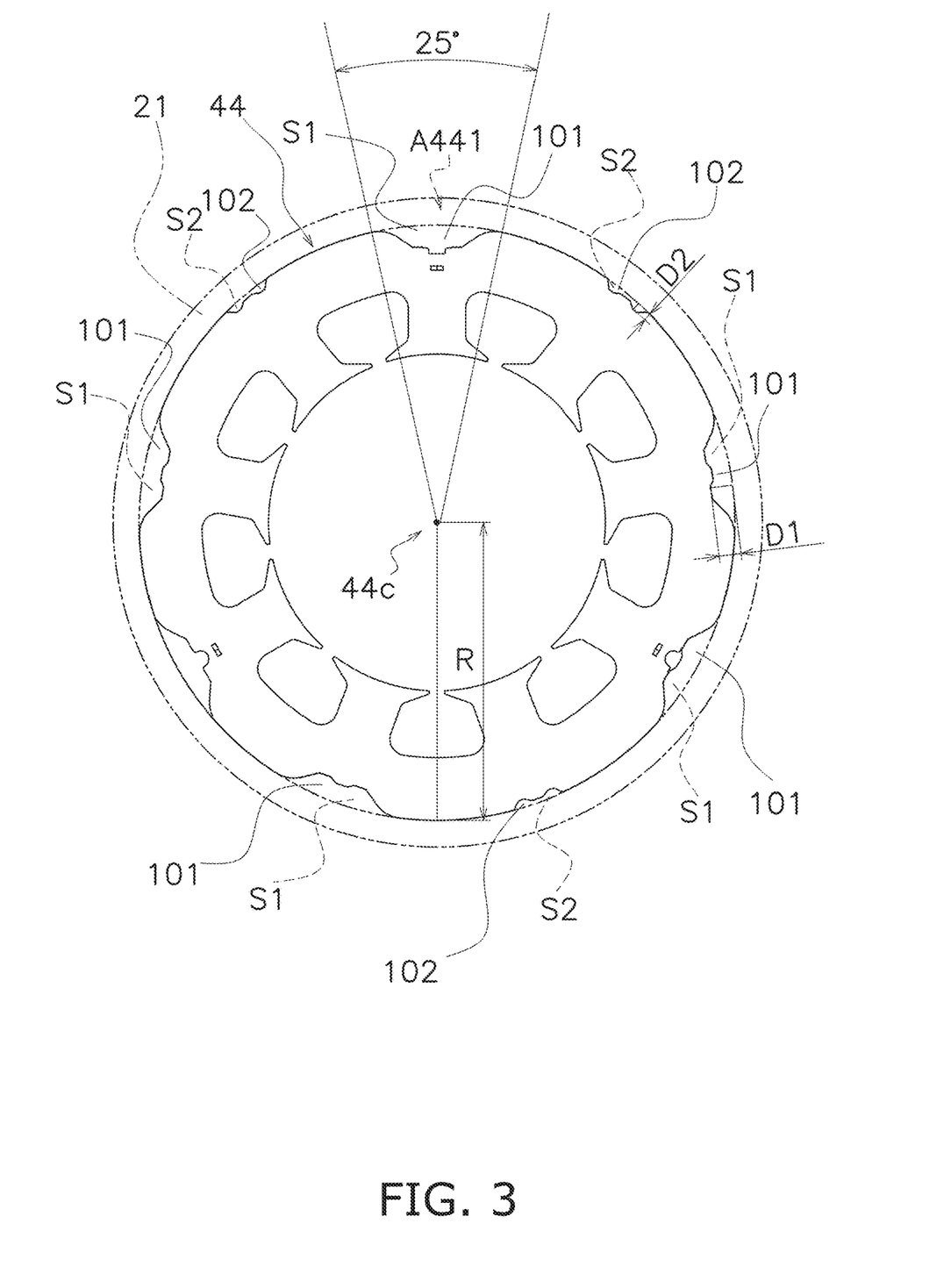
FIG. 3 is plan view of the casing 20 and the core 44 according to the embodiment of the present disclosure.

According to FIG. 3, the sound level is highest when there are provided nine first passages 101, and decreases as the number of first passages 101 decreases. In other words, noise is largest when there are provided nine first passages 101, and is reduced as the number of first passages 101 decreases.

For example, assuming that the sound level is 100% when there are provided nine first passages 101, the sound level decreases to 92% when the number of first passages 101 is decreased to five. The sound level decreases to 89% when the number of first passages 101 is decreased to four.

Meanwhile, the oil run out level does not have significant change between the case where there are provided nine first passages 101 and the case where there are provided five first passages 101. In other words, provision of at least five first passages 101 will lead to sufficient inhibition of oil run out.

However, assuming that the oil run out level is 100% when there are provided nine first passages 101, the oil run out level increases to 500% when the number of first passages 101 is decreased to four.

Accordingly, the sound level decreases as the number of first passages 101 decreases, but the oil run out level rapidly increases when the number of first passages 101 is four or less. In view of noise reduction and inhibition of running out of oil, it will be desired to provide five first passages 101.

(5) CHARACTERISTICS

5-1

A rotary compressor including a nine-slot motor having nine teeth and nine slots provided at a core portion of a motor stator conventionally has nine concave portions respectively disposed radially outside the teeth of the motor stator. The nine concave portions and an inner circumferential surface of a cylindrical portion of a casing constitute nine passages allowing communication between a first side and a second side of the motor stator. The nine passages are used to return, to an oil reservoir, lubricating oil separated in an upper high-pressure space. In other words, the nine passages enable inhibition of running out of oil.

Meanwhile, an internal space of the casing of the rotary compressor has discharge pulsation generated by a refrigerant discharged from a compression mechanism. Discharge pulsation indicates pressure variation in a discharge space caused by a compressed refrigerant periodically flowing from the compression mechanism into the discharge space. When pressure variation caused by the discharge pulsation propagates outside the compressor via a discharge pipe, an outdoor unit vibrates. This causes noise generated from the outdoor unit. In the rotary compressor including the nine-slot motor having the nine teeth and the nine slots provided at the core portion of the motor stator, discharge pulsation reaches the upper high-pressure space via the nine passages and propagates outside the compressor via the discharge pipe.

In order to reduce such noise generated from the outdoor unit, the rotary compressor conventionally includes a soundproof material wound therearound to inhibit vibration propagation in the entire compressor. In contrast, the present disclosure achieves noise reduction by inhibiting vibration propagation inside the compressor.

5-2

Discharge pulsation by a refrigerant periodically discharged from the compression mechanism typically propagates pressure variation to a lower high-pressure space, the passages allowing communication between the first side and the second side of the motor stator, the upper high-pressure space, and the discharge pipe in the mentioned order.

In the rotary compressor 10 according to the present embodiment, assuming that the motor stator 41 has the first to ninth areas A441 to A449 as the areas provided radially outside the nine teeth 44b, the motor stator 41 has the first concave portions 81 provided respectively in five of the first to ninth areas A441 to A449. The motor stator 41 further has the second concave portion 82 in at least one of four areas other than the areas including the first concave portions 81.

The five first concave portions 81 and the inner circumferential surface 21a of the cylindrical portion 21 constitute the five first passages 101 allowing communication between the first side and the second side of the motor stator 41.

There is further provided at least one second passage 102 that is constituted by the at least one second concave portion 82 and the inner circumferential surface 21a of the cylindrical portion 21 and allows communication between the first side and the second side of the motor stator 41.

As described above, discharge pulsation passes through the passages allowing communication between the first side and the second side of the motor stator to propagate pressure variation.

In the configuration according to the present disclosure, the motor stator 41 is provided with the five first passages 101 and the at least one second passage 102. In comparison to the case where the motor stator has nine passages allowing communication between the first side and the second side, the configuration according to the present disclosure is decreased in the number of passages or is reduced in sectional area of the passages.

This increases flow path resistance in the case where discharge pulsation passes through the five first passages 101 and the at least one second passage 102 at the motor stator 41.

This increases pressure loss caused when the discharge pulsation passes through the five first passages 101 and the at least one second passage 102 at the motor stator 41, to inhibit propagation of pressure variation caused by the discharge pulsation.

Pressure variation propagating to the upper high-pressure space 91 is decreased in amplitude in this manner, to also decrease pressure variation propagating outside the compressor via the discharge pipe 70 and inhibit noise generated from the outdoor unit.

5-3

At least one second passage 102 is provided in any of four areas other than the five areas including the first passages 101. The second passage 102 has a sectional area S2 smaller than a first sectional area S1 of the first passages 101. Specifically, the sectional area S2 of the second passage 102 corresponds to 10% to 25% of the sectional area S1 of the first passages 101. A second maximum depth D2 as a maximum value of a radial length of the second passage 102 is smaller than a first maximum depth D1 as a maximum value of a radial length of the first passages 101. Specifically, the second maximum depth D2 corresponds to 10% to 45% of the first maximum depth D1.

5-4

Assuming that one of the first passages 101 has a first end and a second end as both circumferential ends along the inner circumferential surface 21a of the cylindrical portion, a first straight line connecting the rotation center 44c of the crankshaft 50 and the first end and a second straight line connecting the rotation center of the crankshaft 50 and the second end form an angle having 15 to 35 degrees. The five first passages 101 can thus be provided continuously as in an exemplary case where the first passages are provided respectively in the first area A441, the second area A442, the third area A443, the fourth area A444, and the fifth area A445.

The five first passages 101 provided at the motor stator 41 are desired to be evenly disposed in the first to ninth areas A441 to A449. The first passages 101 are evenly disposed to inhibit unbalanced stress at the motor stator 41 when the motor 40 is fixed to the casing 20 by shrink fitting or the like.

In a case where the five first passages 101 are disposed collectively in areas positioned on one side with respect to the vertical direction, the motor stator 41 has unbalanced stress. In such a case, the inner circumferential surface 44e of the annular portion 44a is pushed outward by stress on the side with larger stress of the motor stator 41, leading to deformation of an inner diameter portion of the motor stator 41 and unevenness at the gap 43 to cause noise.

The five first passages 101 according to the present embodiment are thus provided respectively in the first area A441, the third area A443, the fourth area A444, the sixth area A446, and the eighth area A448 as depicted in FIG. 2.

(6) MODIFICATION EXAMPLES

The embodiment described above provides an exemplary case, while the above embodiment is not intended to limit contents of the present disclosure and the contents of the present disclosure are not limited to the above embodiment. The contents of the present disclosure obviously include also aspects obtained through appropriate modification without departing from the purpose of the present disclosure.

(6-1) Modification Example A

The above embodiment exemplifies the case where the five first passages 101 provided evenly at the motor stator 41 are disposed respectively in the first area A441, the third area A443, the fourth area A444, the sixth area A446, and the eighth area A448.

However, provision of the five first passages 101 at the motor stator 41 achieves noise reduction through inhibition of vibration propagation inside the compressor. Accordingly, the first passages 101 may alternatively be provided unevenly as in an exemplary case where the first passages 101 are disposed respectively in the first area A441, the second area A442, the third area A443, the fourth area A444, and the fifth area A445.

(6-2) Modification Example B

The above embodiment exemplifies the case where the compressor is configured as the rotary compressor. However, the embodiment of the present disclosure should not be limited to the rotary compressor, and is also applicable to a swing compressor.

The embodiment of the present disclosure has been described above. Various modifications to modes and details should be available without departing from the object and the scope of the present disclosure recited in the claims.

The invention claimed is:

1. A rotary compressor comprising:
a compression mechanism;
a casing having a cylindrical portion and covering the compression mechanism;
a motor stator including
stacked steel plates obtained by stacking a plurality of steel plates, the stacked steel plates fixed to an inner surface of the cylindrical portion,
teeth, and
slots,
a number of the teeth and a number of the slots being nine; and
a motor rotor configured to rotate a crankshaft that is configured to drive the compression mechanism,
the stacked steel plates having
first to ninth areas provided radially outside the nine teeth,
first concave portions provided respectively in five of the first to ninth areas, and
a second concave portion provided in at least one of four areas other than the five areas including the first concave portions,
the five first concave portions and an inner circumferential surface of the cylindrical portion forming five first passages therebetween allowing communication between a first or upper side and a second or bottom side of the motor stator,
the second concave portion and the inner circumferential surface of the cylindrical portion forming at least one second passage therebetween allowing communication between the first or upper side and the second or bottom side of the motor stator,
each of the first passages having a sectional area that is larger than a sectional area of the second passage,
no passage having a sectional area that is larger than the sectional area of the first passage being formed in the four areas other than the five areas where the first passages are located,
three or more areas including the first concave portions being not continuous in the first area to the ninth area, and
each of the first passages and each of the at least one second passages being circumferentially spaced from circumferentially adjacent the first or second passages.

2. The rotary compressor according to claim 1, wherein the inner circumferential surface of the cylindrical portion has a radius R, the first sectional area of each of the first passages is 0.003 to 0.008 times $\pi R^2$.

3. The rotary compressor according to claim 1, wherein the sectional area of the second passage is 10% to 25% of the sectional area of each of the first passages.

4. The rotary compressor according to claim 1, wherein the inner circumferential surface of the cylindrical portion has a radius R,
each of the first passages has a first maximum depth D1 as a maximum value of a radial length, and
the first maximum depth D1 is 0.05 to 0.11 times the radius R.

5. The rotary compressor according to claim 3, wherein the inner circumferential surface of the cylindrical portion has a radius R,
each of the first passages has a first maximum depth D1 as a first maximum value of a radial length, and
the second passage has a second maximum depth D2 as a second maximum value of a radial length,
the second maximum depth D2 is 10% to 45% of the first maximum depth D1.

6. The rotary compressor according to claim 1, wherein each of the first passages has a first end and a second end as circumferential ends along the inner circumferential surface of the cylindrical portion, and
a first straight line connects a rotation center of the crankshaft and the first end, a second straight line connects the rotation center of the crankshaft and the second end, and the first and second straight lines form an angle of 15 to 35 degrees therebetween.

7. The rotary compressor according to claim 1, wherein the first to ninth areas are aligned in order, and
the stacked steel plates have the first concave portions provided respectively in the first area of the first to ninth areas, the third area of the first to ninth areas, the fourth area of the first to ninth areas, the sixth area of the first to ninth areas, and the eighth area of the first to ninth areas.

8. The rotary compressor according to claim 2, wherein the sectional area of the second passage is 10% to 25% of the sectional area of each of the first passages.

9. The rotary compressor according to claim 2, wherein the inner circumferential surface of the cylindrical portion has a radius R,
each of the first passages has a first maximum depth D1 as a maximum value of a radial length, and
the first maximum depth D1 is 0.05 to 0.11 times the radius R.

10. The rotary compressor according to claim 2, wherein
each of the first passages has a first end and a second end as circumferential ends along the inner circumferential surface of the cylindrical portion, and
a first straight line connects a rotation center of the crankshaft and the first end, a second straight line connects the rotation center of the crankshaft and the second end, and the first and second straight lines form an angle of 15 to 35 degrees therebetween.

11. The rotary compressor according to claim 2, wherein the first to ninth areas are aligned in order, and
the stacked steel plates have the first concave portions provided respectively in the first area of the first to ninth areas, the third area of the first to ninth areas, the fourth area of the first to ninth areas, the sixth area of the first to ninth areas, and the eighth area of the first to ninth areas.

12. The rotary compressor according to claim 3, wherein the inner circumferential surface of the cylindrical portion has a radius R,
each of the first passages has a first maximum depth D1 as a maximum value of a radial length, and
the first maximum depth D1 is 0.05 to 0.11 times the radius R.

13. The rotary compressor according to claim 3, wherein
each of the first passages has a first end and a second end as circumferential ends along the inner circumferential surface of the cylindrical portion, and
a first straight line connects a rotation center of the crankshaft and the first end, a second straight line connects the rotation center of the crankshaft and the second end, and the first and second straight lines form an angle of 15 to 35 degrees therebetween.

14. The rotary compressor according to claim 3, wherein the first to ninth areas are aligned in order, and
the stacked steel plates have the first concave portions provided respectively in the first area of the first to ninth areas, the third area of the first to ninth areas, the fourth area of the first to ninth areas, the sixth area of the first to ninth areas, and the eighth area of the first to ninth areas.

15. The rotary compressor according to claim 4, wherein
each of the first passages has a first end and a second end as circumferential ends along the inner circumferential surface of the cylindrical portion, and
a first straight line connects a rotation center of the crankshaft and the first end, a second straight line connects the rotation center of the crankshaft and the second end, and the first and second straight lines form an angle of 15 to 35 degrees therebetween.

16. The rotary compressor according to claim 4, wherein the first to ninth areas are aligned in order, and
the stacked steel plates have the first concave portions provided respectively in the first area of the first to ninth areas, the third area of the first to ninth areas, the fourth area of the first to ninth areas, the sixth area of the first to ninth areas, and the eighth area of the first to ninth areas.

17. The rotary compressor according to claim 6, wherein the first to ninth areas are aligned in order, and
the stacked steel plates have the first concave portions provided respectively in the first area of the first to ninth areas, the third area of the first to ninth areas, the fourth area of the first to ninth areas, the sixth area of the first to ninth areas, and the eighth area of the first to ninth areas.

* * * * *